(12) United States Patent
Feldman

(10) Patent No.: US 11,048,894 B2
(45) Date of Patent: *Jun. 29, 2021

(54) AUTHENTICATION SYSTEMS AND METHODS

(71) Applicant: ARK Ideaz, Inc., Pottstown, PA (US)

(72) Inventor: Randy Feldman, Pottstown, PA (US)

(73) Assignee: Ark Ideaz, Inc., Pottstown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,197

(22) Filed: Mar. 11, 2020

(65) Prior Publication Data
US 2020/0210659 A1    Jul. 2, 2020

Related U.S. Application Data

(63) Continuation of application No. 16/106,206, filed on Aug. 21, 2018, which is a continuation of application No. 15/835,638, filed on Dec. 8, 2017, now Pat. No. 10,410,024, which is a continuation of application No. 14/754,062, filed on Jun. 29, 2015, now Pat. No. 9,870,496, which is a continuation of application No. 13/495,183, filed on Jun. 13, 2012, now Pat. No. 9,070,131.

(60) Provisional application No. 61/496,772, filed on Jun. 14, 2011.

(51) Int. Cl.
*G06K 7/10* (2006.01)
*G01S 5/04* (2006.01)
*G06Q 30/00* (2012.01)
*G08B 7/06* (2006.01)
*G01S 13/87* (2006.01)

(52) U.S. Cl.
CPC ............ *G06K 7/10366* (2013.01); *G01S 5/04* (2013.01); *G06K 7/10346* (2013.01); *G06Q 30/0185* (2013.01); *G08B 7/06* (2013.01); *G01S 13/878* (2013.01)

(58) Field of Classification Search
None
See application file for complete search history.

(56) References Cited

U.S. PATENT DOCUMENTS 5,681,165 A * 10/1997 Feldman ............... A61C 7/14
433/8
6,904,410 B1 * 6/2005 Weiss ................. G06Q 10/087
705/26.61
(Continued)

*Primary Examiner* — Fekadeselassie Girma
(74) *Attorney, Agent, or Firm* — The Juhasz Law Firm

(57) ABSTRACT

A system includes a first computing device having a first non-transitory machine-readable storage medium, first communication circuitry, and at least one first processor in communication with the first non-transitory machine-readable storage medium and the first communication circuitry. The at least one first processor is configured to execute instructions stored in the first non-transitory machine-readable storage medium to cause the first communication circuitry to receive a first signal from a first transmission medium, calculate a first authentication value for an object based on data included in the first signal, and cause the first communication circuitry to transmit a second signal to the first transmission medium. The second signal identifies whether the object is authentic based, at least in part, on the first authentication value.

16 Claims, 11 Drawing Sheets

(56) References Cited

U.S. PATENT DOCUMENTS

| | | | | |
|---|---|---|---|---|
| 7,222,791 B2* | 5/2007 | Heilper | | G06Q 30/06 235/385 |
| 8,818,874 B2* | 8/2014 | Veseli | | G06Q 20/203 705/21 |
| 8,831,677 B2* | 9/2014 | Villa-Real | | H04L 63/0861 455/552.1 |
| 9,070,131 B2* | 6/2015 | Feldman | | G08B 7/06 |
| 9,870,496 B2* | 1/2018 | Feldman | | G01S 5/04 |
| 2001/0016871 A1* | 8/2001 | Fujita | | G06Q 20/20 709/203 |
| 2002/0010679 A1* | 1/2002 | Felsher | | G06Q 20/3674 705/51 |
| 2003/0050891 A1* | 3/2003 | Cohen | | G06Q 40/02 705/42 |
| 2004/0088231 A1* | 5/2004 | Davis, Jr. | | H04L 9/3226 705/28 |
| 2005/0080677 A1* | 4/2005 | Foss, Jr. | | G06Q 20/24 705/16 |
| 2006/0004639 A1* | 1/2006 | O'Keefe, Jr. | | G06Q 20/12 705/26.35 |
| 2006/0022059 A1* | 2/2006 | Juds | | G06K 7/1434 235/494 |
| 2006/0253710 A1* | 11/2006 | Koo | | G06Q 20/40145 713/186 |
| 2007/0005331 A1* | 1/2007 | Han | | G06Q 99/00 703/22 |
| 2007/0106897 A1* | 5/2007 | Kulakowski | | G06F 21/35 713/171 |
| 2008/0005557 A1* | 1/2008 | Chester | | H04L 9/00 713/156 |
| 2008/0191009 A1* | 8/2008 | Gressel | | G07C 9/27 235/382 |
| 2009/0106134 A1* | 4/2009 | Royyuru | | G06Q 40/00 705/35 |
| 2010/0205652 A1* | 8/2010 | Bouchard | | H04L 63/0892 726/3 |
| 2014/0162598 A1* | 6/2014 | Villa-Real | | G06Q 20/363 455/411 |
| 2019/0005285 A1* | 1/2019 | Feldman | | G08B 7/06 |
| 2020/0210659 A1* | 7/2020 | Feldman | | G06K 7/10366 |

\* cited by examiner

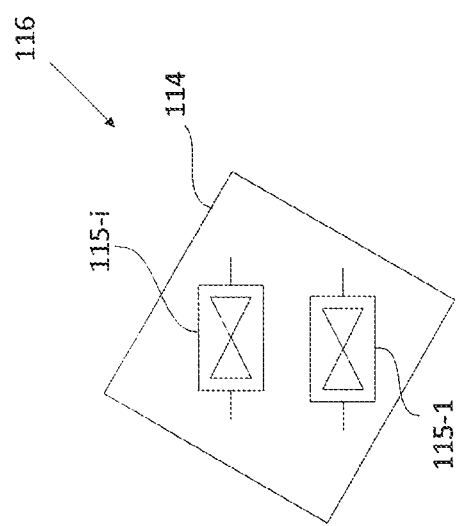

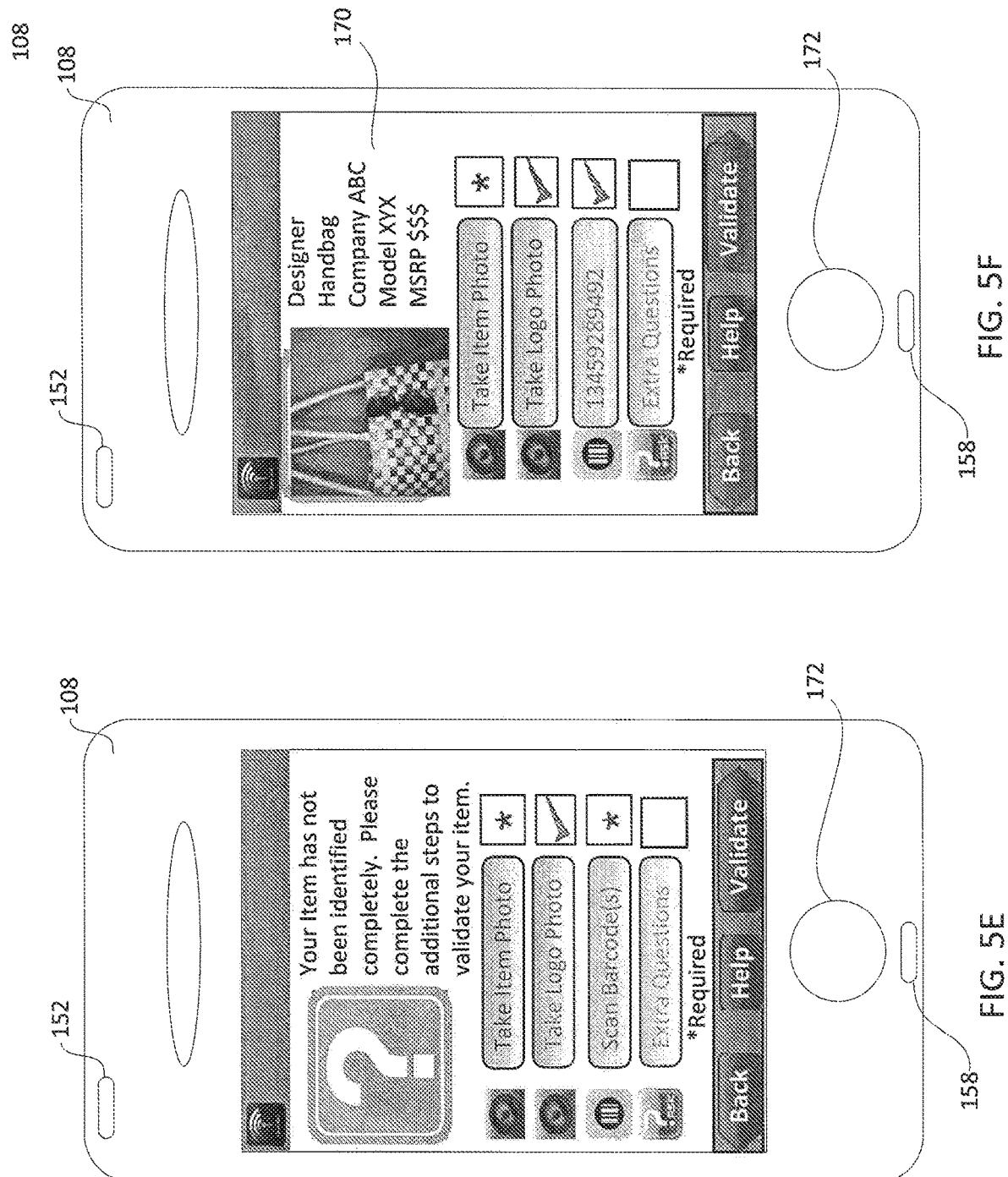

AUTHENTICATION SYSTEMS AND METHODS

CROSS-REFERENCE TO RELATED APPLICATIONS

This application is a continuation of U.S. patent application Ser. No. 16/106,206, filed Aug. 21, 2018; U.S. patent application Ser. No. 16/106,206 is a continuation of U.S. patent application Ser. No. 15/835,638, filed Dec. 8, 2017, now U.S. Pat. No. 10,410,024, issued Sep. 10, 2019; U.S. patent application Ser. No. 15/835,638 is a continuation of U.S. patent application Ser. No. 14/754,062, filed Jun. 29, 2015, now U.S. Pat. No. 9,870,496, issued Jan. 16, 2018; U.S. patent application Ser. No. 14/754,062 is a continuation of U.S. patent application Ser. No. 13/495,183, filed on Jun. 13, 2012 (now U.S. Pat. No. 9,070,131, issued Jun. 30, 2015), which claims priority to U.S. Prov. Pat. Appl. No. 61/496,772 filed on Jun. 14, 2011; the entireties of each of these patent documents are herein incorporated by reference.

FIELD OF DISCLOSURE

The disclosed systems and methods relate to authentication. More particularly, the disclosed systems and methods relate to the authentication of objects using various parameter value sensors for discerning attributes of an object, and a data processing system and associated data storage, for comparing sensed parameters to stored criteria that are associated with authenticity.

BACKGROUND

Counterfeit goods are damaging to the owners of name brand products as well as damaging to unknowing purchasers of such goods. For example, brand name owners or manufacturers suffer as they lose out on revenue from the sale of counterfeit goods and such goods can also damage the reputation of the brand name owner if the goods are shoddily made. Consumers can be damaged by unknowingly over-paying for counterfeit goods that they believe are authentic.

SUMMARY

In some embodiments, a system includes a machine-readable storage medium, a processor in communication with the machine-readable storage medium, communication circuitry in communication with the processor; and a plurality of sensors in communication with the processor. Each of the plurality of sensors is configured to generate an electrical signal in response to receiving wave energy. The processor is configured to control data acquisition for authenticating an object using at least a subset of the plurality of sensors, calculate an authentication value based on signals received from the subset of the plurality of sensors, and cause the communication circuitry to transmit an authentication request including the authentication value to an authentication entity.

In some embodiments, an authentication method includes performing a plurality of data acquisition processes on an object using sensors configured to generate electrical signals in response to receiving wave energy, calculating an authentication value based on signals received from at least a subset of the sensors, and transmitting an authentication request including the authentication value to an authentication entity.

In some embodiments, a machine readable storage medium is encoded with program code, wherein when the program code is executed by a processor, the processor performs a method. The method includes performing a plurality of data acquisition processes on an object using sensors configured to generate electrical signals in response to receiving wave energy, calculating an authentication value based on signals received from at least a subset of the sensors, and transmitting an authentication request including the authentication value to an authentication entity.

BRIEF DESCRIPTION OF THE DRAWINGS

FIG. 3A illustrates one example of a diagram key of an Authentic Real Thing in accordance with some embodiments.

FIG. 3B illustrates one example of a diagram key of an Added Indelible Marker in accordance with some embodiments.

FIG. 3C illustrates one example of a diagram key of an Authentic Real Thing including an Added Indelible Marker in accordance with some embodiments.

FIGS. 5A-5F illustrate examples of screen shots of an immutable token reader during a authentication process in accordance with some embodiments.

DETAILED DESCRIPTION

This description of the exemplary embodiments is intended to be read in connection with the accompanying drawings, which are to be considered part of the entire written description.

The disclosed systems and methods advantageously provide the ability to authenticate objects, referred to herein as authentic real things ("ART"), using mobile and stationary devices. The number and type of objects that can be authenticated are not limited, and examples of such objects include, but are not limited to, apparel, footwear, fashion accessories, consumer electronics, consumer appliances, collectibles (dolls, sport paraphernalia, etc.), pharmaceuticals, medical devices, and large assemblies like cars, trucks, and planes to list but only a few possibilities.

Figure 1:
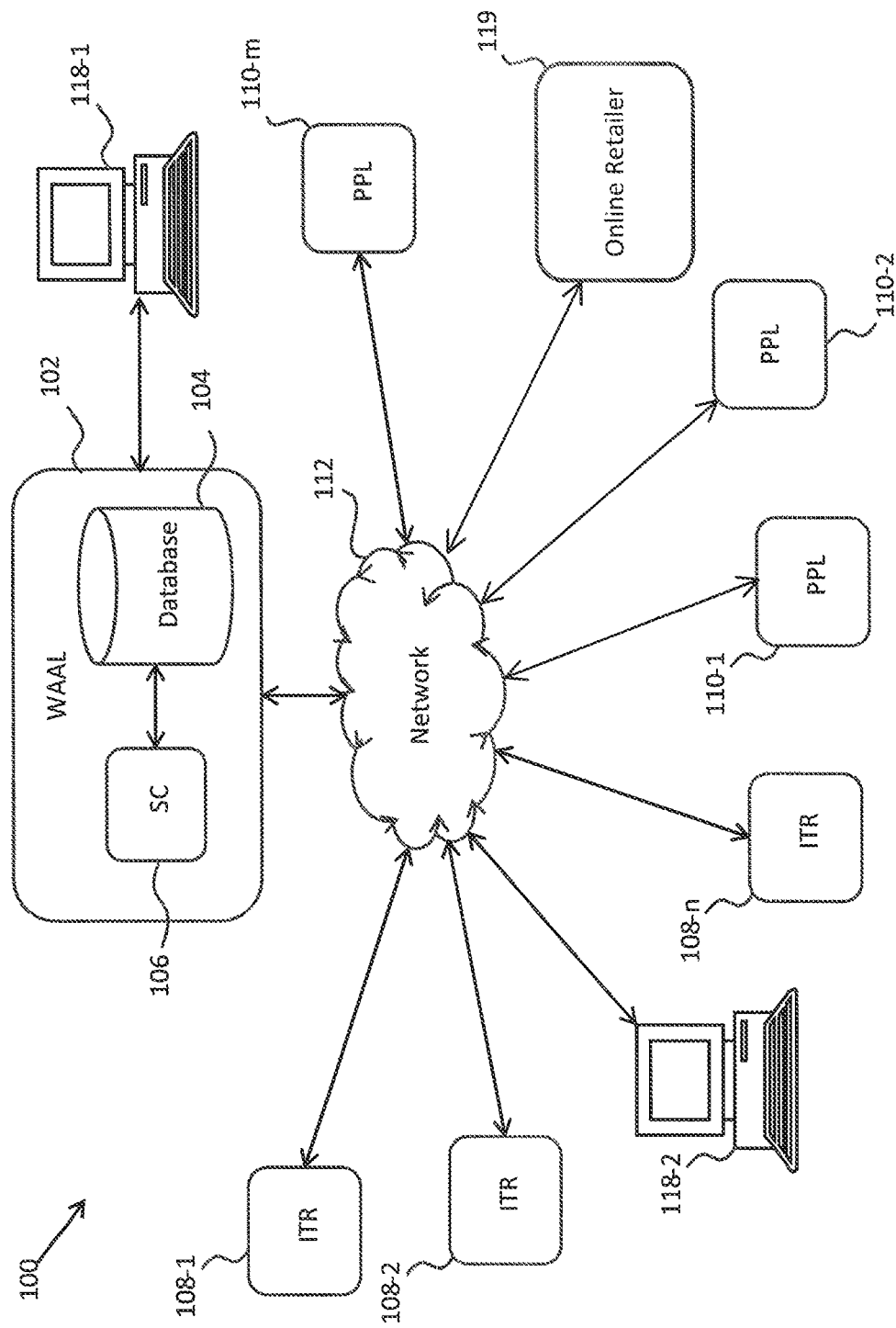
FIG. 1 is a block diagram of one example of an authentication system in accordance with some embodiments.

FIG. 1 illustrates one example of a World-Wide Validation Network ("WWVN") 100 in accordance with some embodiments. WWVN 100 includes one or more World-Wide ART & Artifact Libraries ("WAALs") 102 that include a database 104 and a System Curator ("SC") 106, which may be implemented in one or more processors or central processing units ("CPU") as will be understood by one of ordinary skill in the art. The one or more WAALs 102 are in communication with one or more Immutable Token Readers ("ITRs") 108-1, 108-2, ..., 108-n (collectively "ITRs 108") and with one or more Public and Private Libraries ("PPLs") 110-1, 110-2, 110-m (collectively "PPLs 110") via network 112.

In some embodiments, WAAL(s) 102 are implemented using one or more computers or servers on which database 104 and SC 106 are implemented. Database 104 can be implemented as a relational database that stores data of ART 114 that are used to define True Artifacts ("TAs") 116 that are described in greater detail below. Version history, information, lineage, and other details about an ART 114 and TA 116 for validation and tracking are also stored in database 104.

SC 106 includes one or more processors and software and/or program(s) configured to manage the communication, indexing, activities and functions of the WAAL 102. Examples of such functions include, but are not limited to, authentication calculations, registration and record management of TAs and their respective digital fingerprints, communications with ITRs 108 and PPLs 110, and generating reports and analytics to users of local terminals 118-1 or remote terminals 118-2. In some embodiments, SC 106 provides an application programming interface ("API") for WAAL 102. The API provides for access and bulk processing of a large number of requests from ITRs 108 and PPLs 110. Online retailers, such as online retailer 119, can access database 104 and have WAAL 102 authenticate goods via network 114 by communicating with WAAL 102 via the API.

SC 106 is configured to perform analytics on data stored in database 104 and/or on data received from ITRs 108 and/or PPLs 110 via network 112. Such analytics involve determining whether attributes or combinations of attributes of objects, which attributes have been sensed or reported, qualify the objects as authentic real things (ART) or as true artifacts (TA). In addition to comparing sensed or reported attributes versus stored values that definitively distinguish objects (such as a unique identifying code), the analytics can involve plural attributes and can be implemented using one or more techniques including, but not limited to, pattern matching, artificial intelligence, optical recognition, key marking, fuzzy logic, chaos theory, entropic intelligence networks, Bayesian network(s), and quantum physics.

As described in greater detail below, data received at WAAL 102 and analyzed by SC 106 can be derived from an interrogation of one or more added indelible markers ("ATMs") such as, for example, radio frequency identification ("RI ID") tag(s), product serial number(s), transponder identification numbers, doping agents, barcodes, quick response ("QR") codes, invisible ink(s), software keys, certificates of authenticity codes, colors, sounds, and combinations thereof by ITRs 108. Such data is combined to provide a unique identification for the ART referred to herein as an Immutable Token ("IT") of the ART. In some embodiments, SC 106 performs weighting of AIMS of an ART to calculate the IT.

In some embodiments, the weighting of AIMS is based on the likelihood that the AIMS can be forged or counterfeited. For example, the physical appearance of an article of manufacture, e.g., a shirt, bag, pair of shoes, etc., can be somewhat easily copied or replicated whereas an RFID tag number and a manufacturer serial number are less likely to match an authentic RFID tag number and manufacturer serial number affixed to an object during manufacture. Consequently, the RFID tag number and manufacturer serial number can be more heavily weighted than the physical appearance of an object. As will be understood by one of ordinary skill in the art, taking all available AIM values into account increases the certainty that an object is authentic.

Additionally, the physical appearance of authentic goods may vary due to the manufacturing process and the use of multiple AIMS also reduces the likelihood that an authentic item is falsely identified as being counterfeit. For example, colors and the location of certain features of articles of manufacture may vary due to slight variances in dyes used to create cloth for a shirt or the exact position of buttons and, logos that are affixed by hand to a garment. Weighting such AIM values less than AIM values that provide a higher degree of certainty reduces the likelihood of a false negative authentication.

Data stored in WAAL 102 is amassed over time progressively improving the probability that calculations performed by WAAL 102 are accurate in determining or disproving the authenticity of an object, i.e., to determine accurately whether or not the object is an ART 114. WAAL 102 is configured to perform token (e.g., IT) management and provide real-time communication with ITRs 108 and PPLs 110, including validation and verification of the authenticity of an object, i.e., ART.

In some embodiments, WAAL 102 is configured to store attributes of known facsimile or counterfeit goods to improve the ability of WAAL 102 to identify fraudulent or counterfeit goods. For example, counterfeit goods may include differences in the physical appearance of the good that are known to a manufacturer or producer of the goods, but are not well-known by a prospective buyer. In some embodiments, these known physical differences are stored in WAAL 102 and used to identify an object as counterfeit.

For example, known counterfeit goods may include a tag in a location that is offset from the location in which the same or similar tag of an authentic item is to be located or the known counterfeit good may include differences in a collar or in the number of buttons. The attributes of known counterfeit goods are stored by the WAAL 102 and can be used during an authentication process by analyzing an image collected by an ITR to assess whether the object being authenticated is in fact authentic or counterfeit. In this manner, the knowledge base of the WAAL 102 is increased over a period of time as data on known counterfeit goods (and authentic goods) are collected and stored in WAAL 102.

ITRs 108 includes devices configured to read, interrogate, and interpret one or more AIMS 118, which are described in greater detail below, using one or more sensors configured to generate electrical signals in response to wave energy. Examples of such wave sensors includes receivers for receiving audio sounds, a camera Or light-sensitive sensor for performing optical measurements, and magnetic-sensitive sensors, to list but only a few possibilities.

In some embodiments, ITRs 108 are implemented in a mobile form factor such as, for example, a fob, a smartphone, portable music player, tablet computer, laptop computer, personal digital assistant ("PDA"), or other portable electronic device with capacity for wireless data communication or at least intermittent coupling into a data network. In some embodiments, ITRs 108 are implemented in more stationary devices such as a desktop computer, kiosk, and/or point-of-sale terminals.

Figure 2B:
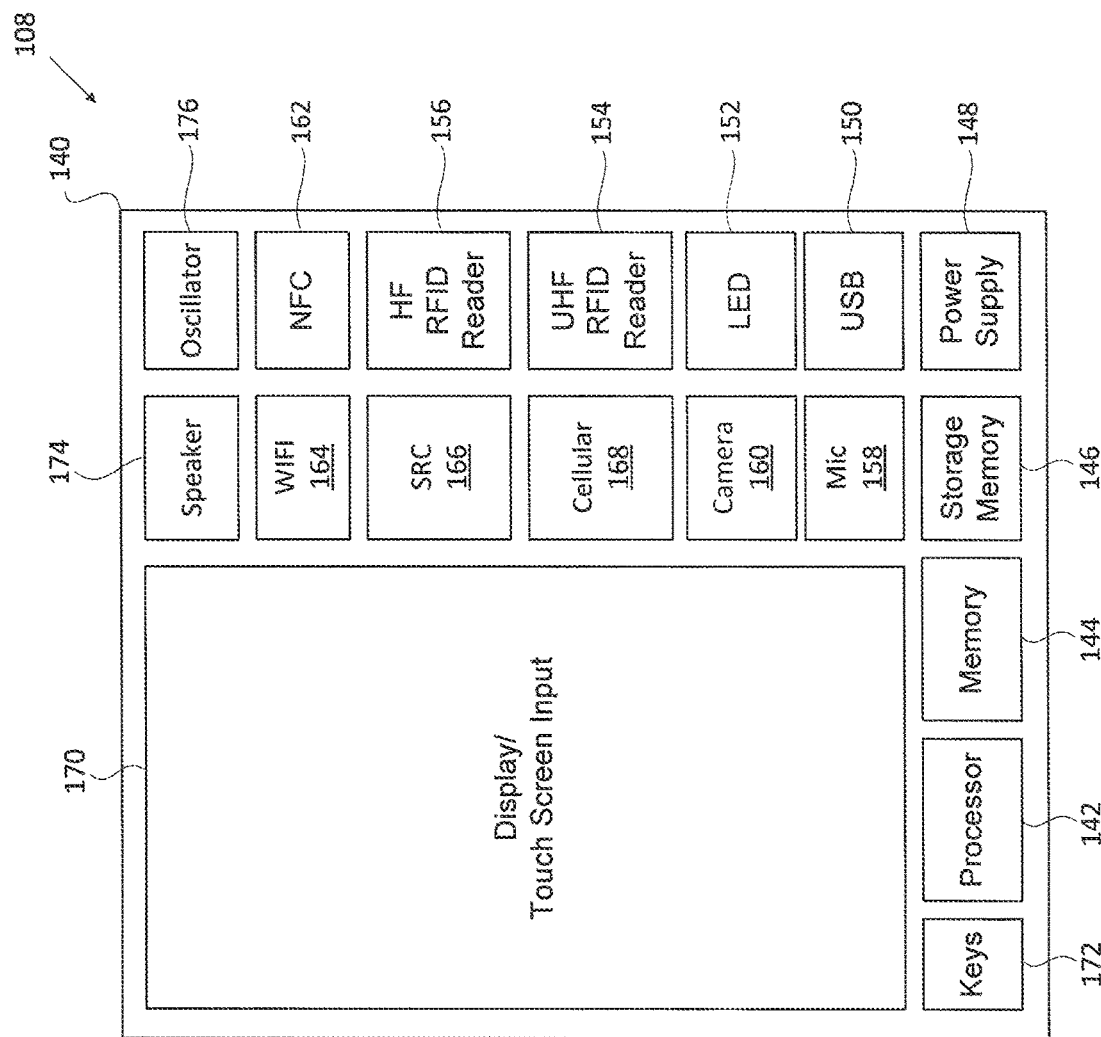
FIGS. 2A and 2B are block diagrams of examples of immutable token readers in accordance with some embodiments.
Figure 2A:
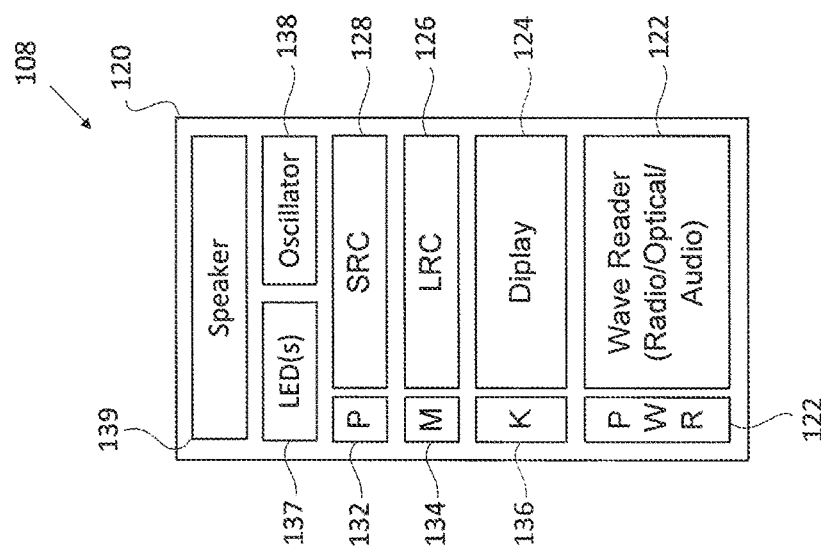

As illustrated in FIG. 2A, ITR 108 is illustrated as a mobile module 120 configured to communicate with other mobile devices, such as mobile unit 140 illustrated in FIG. 2B, and/or other stationary devices such as a computer. ITR module 120 includes a wave reader 122 that is a multi-function sensor array configured to sense radio, optical, magnetic, audio, and other wave energy. Wave reader 122 is configured to receive waves emitted from an object such that a radio-audio-optical-electronic ("Raotronic") fingerprint of the object can be calculated as described in greater detail below.

In some embodiments, ITR module 120 includes a display 124 configured to display images and text to a user. In some embodiments, display 124 is a touch screen display configured to display virtual icons or keys through which a user may input data. In some embodiments, module 120 is a fob without a display 124, but that includes other circuitry and features illustrated in FIG. 2A.

A long-range and/or cellular communication chip ("LRC") or circuitry 126 provides module 120 with the ability to communication via a cellular network and/or a WIFI network. A cellular chip enables module 120 to communication with WAAL 102 and/or PPLs 110 via a wireless communication protocol such as, for example, CDMA, GSM, 3G, and 4G LTE, to list but only a few possibilities. As described in greater detail below, ITR module 120 (and more generally ITRs 108) exchange calculated IT data values, user profile data, reports, advertising, and/or other data with WAALs 102 and/or with PPLs 110 via network 112, which may be accessed via the Internet, a cellular network, and/or other network.

In embodiments in which LRC 126 includes a WIFI adapter, LRC 126 is configured to be placed into a promiscuous mode such that one or more AIMs can be interrogated. One example of this is that LRC 126 is configured to read the media access control ("MAC") or burned in/permanent address of a network card present in another device (e.g., a computer). As will be understood by one skilled in the art, a MAC address of a network card is a unique, non-duplicated code set by the manufacturer, equivalent in discussion to the fact that all transponding devices produced in accordance to internal agreement of manufacturers are unique.

In some embodiments, modules 120 also includes a short range communication chip ("SRC") 128 such as, for example, a Bluetooth, Near-Field Communication ("NFC"), or other chip that enables module 120 to pair with (e.g., communicate data bidirectionally with) other devices. Although communication chips 126 and 128 are depicted as separate components, one of ordinary skill in the art will understand that chips 126 and 128 may be implemented in a single package. In some embodiments, SRC chip 128 can be placed in a promiscuous mode in which SRC chip 128 performs data gathering.

A power supply 130, such as a rechargeable or replaceable battery, is configured to provide power to each of the active devices of module 120. In addition to the active devices described above, module 120 also includes one or more processors or CPUs 132. Processor (s) is configured to execute an ART & Artifact Validation Program ("AAVP"). The AAVP provides the instructions for module 120 to interrogate an object and calculate IT values to assess the authenticity of the object. When executing the AAVP, processor(s) 132 may cause display 124 to display information about the object(s) in question to a user. Examples of such information includes, but is not limited to, history, status, and/or location of the object.

Module 120 also includes a memory 134 such as a random access memory ("RAM") and/or a read only memory ("ROM"). Memory 134 is a non-transitory machine readable storage medium configured to store the instructions for executing the AAVP. Memory 134 is also configured to store data obtained by module 120 from wave reader 122 and communication chips 126 and 128. One or more keys 136 or other user input device can also be included in module 120.

In some embodiments, module 120 includes means for conveying signals and notifications to a user beyond a display. For example, module 120 includes one or more light emitting diode(s) ("LED(s)") 137 are configured to emit one or more colors of light based on an authentication response as described in greater detail below. An oscillator 138 is configured to vibrate or generate a tactile notification, and a speaker 139 is configured to generate an audible notification to a user. In some embodiments, the notifications emitted by one or more of LEDs 137, oscillator 138, and speaker 139 are to notify a user as to Whether an object has been authenticated as described in greater detail below.

ITR module 120 can communicate with a mobile device 140 using a wireless, wired, or other communication channel. As shown in FIG. 2B, mobile device 140 includes one or more processors 142 in signal communication with a persistent memory 144 and a more volatile memory 146. In some embodiments, memory 144 is configured to store the AAVP, and memory 146 is configured to store data acquired by mobile device 140. A power supply 148 is configured to provide power for mobile device 140, including power to processor(s) 142. Power supply can be a replaceable and/or rechargeable battery as will be understood by one of ordinary skill in the art.

In some embodiments, mobile device 140 includes an attachment port 150, such as a universal serial bus ("USB") interface or a secure digital ("SD") card slot, for transmitting and receiving data via a wired or otherwise mechanical connection (e.g., slot and card).

One or more LED 152 are provided for displaying status signals to a user. In some embodiments, LEDs 152 are used to make visible all or part of an ART. The use and control of LEDs 152, or other illuminating device that produces waves in the visible or ultraviolet range, can be used to expose AIM or other characteristics of ART.

Mobile device 140 includes one or more sensor devices that comprise a wave reader. For example, mobile device 140 includes an ultra-high frequency ("UHF") radio frequency identification ("RFID") reader 154, a high-frequency RFID reader 156, a microphone 158, and a camera 160. Although shown as separate devices, one of ordinary skill in the art will understand that RFID readers 154 and 156 can be implemented as a single device in some embodiments and are configured to interrogate RFID tags that may be embedded or coupled to objects as described in greater detail below.

Microphone 158 and camera 160 are configured to receive audio signals (waves) and light signals (waves), respectively, and generate and/or output electrical signals in response. Camera 160 can be a digital camera that includes photosensitive electronics, such as charge-coupled devices ("CCD") or complementary metal-oxide-semiconductor ("CMOS") image sensors. The sensor array of camera 160 is covered with a patterned color filter mosaic having red, green, and blue regions in the Bayer filter arrangement such that each sensor element can record the intensity of a single primary color of light. Camera 160 interpolates the color information of neighboring sensor elements, through a process called demosaicing to create a final image.

Camera 160 is configured to receive information across a broad spectrum of visible and invisible wavelengths and to detect small objects (e.g. objects on a scale of a few millimeters down to micrometer or microscopic in size). In some embodiments, camera 160 is configured to enable device 140 to perform macro examination of larger images and/or to support dimensional analysis, the collection of pattern information and other "visible" data to analyze ART.

Other physical characteristics like size, weight, range of movement, special movement, mass, scale and others may be calculated or measured with camera 160. Camera 160 may also collect a range of observations or observable points to calculate pattern or patterns for use in validation and authentication.

In some embodiments, camera 160 is used in connection with LEDs 152 or other illuminating device that produces waves in the visible or ultraviolet range. For example, the one or more LEDs 152 are controlled by processor 142 to emit specific wavelength or color combinations to expose patterns specifically sensitive, or that become "visible" to either the device, human or other sensor when exposed to the special light range produced by the LEDs 152 (the classic "invisible ink" technique is a metaphoric example, whereby the writing on an object is only exposed to a certain wavelength of light shined on it. Then the observer can collect the information and provide it to the AAVP). Camera 160 is used to record the resulting image.

Mobile device 140 also includes one or more units for providing communications with other devices. For example, mobile device 140 includes an NFC chip 162, a WIFI or other wireless networking chip 164, a short-range (e.g., a Bluetooth) chip 166, and a cellular chip 168. Communication chips or units 162, 164, 166, and 168 may be separate units or combined into a single package.

Display 170 can be a touchscreen display configured to display information to a user in the form graphics and text. Examples of such information includes, but is not limited to, history, status, and/or location of an object being interrogated for authenticity. One or more keys 172 or other user input device can also be included in mobile device 140 such that a user can input data and control device 140.

In some embodiments, mobile device 140 also includes a speaker 174 and an oscillator 176. LEDs 152, speaker 174, and oscillator 176 are configured to provide notifications to a user. For example, LEDs 152 and display 170 may generate a visual notification to a user, speaker 174 is configured to generate an audible notification to a user, and oscillator 176 is configured to generate a tactile notification to a user.

One of ordinary skill in the art will understand that more stationary devices, such as computers, kiosks, and point-of-sale or checkout devices or registers, to list but only a few possibilities, can be configured as an ITR 108 and include some or all of the features described above with respect to module 120 and mobile device 140.

PPLs 110 can be public or private libraries of ART. For example, a company or manufacturer of goods can develop its own library or database of the signatures of the products the company sells or produces. In some embodiments, PPLs 110 are implemented in one or more servers that are in signal communication with WAAL, 102 and one or more ITRs 108 via network 112. PPLs 110 store AIMs as embedded codes in digital media, software or electronic medium. At some level AIMs are associated to ART in a database residing in PPLs 110.

As mentioned above, ITRs 108 are configured to interrogate objects to determine their authenticity. FIG. 3A illustrates one example of a diagram key of ART 114. ART 114 is used to describe a physical object that is authentic.

FIG. 3B illustrates one example of a diagram key of an AIM 115. In some embodiments, AIMs 115 are applied to ART 114 during the manufacturing process by a manufacturer. Examples of AIMs 115 include, but are not limited to, RFID tags, product serial numbers, transponder identification numbers, doping agents, barcodes, invisible ink(s), software keys, certificates of authenticity codes, and combinations thereof.

In some embodiments, one or more AIMs 115 include tamper-proof RFID (electric or magnetic field sensitive) tags. As will be understood by one of ordinary skill in the art, such tamper-resistant tags include trip mechanisms, which are sewn or otherwise permanently or semi-permanently affixed to an object. In some embodiments, the tamper-resistant tags are chemically or electronically linked to the ART.

If the AIM 115 is equipped or designed with a trip mechanism, then removal or separation of the AIM 115 beyond a certain distance from the ART causes a detectable change in state of the AIM 115. Non-limiting examples of trip mechanisms include physical or electronic switches, a relay, or other closed circuit that is fastened to the object. Removal or tampering is detected by the AIM 115 emitting a signal or changing its response to an interrogation signal due to being in the tampered state.

Another example of a trip mechanism of RFID tags is an antenna wire or conductor that once attached to the object, can only be removed by breaking or destroying the antenna, thus indicating that the AIM 115 has been tampered with an may indicate a suspect piece of ART. The AIM 115 may either cease to function, or otherwise change to indicate to the interrogator that it has been tampered with. This AIM connections can be chemical adhesive to the ART, or an electronic contact switch that triggers a change to the aim when moved equivalent to a mechanical relay, an electronic, voltaic or photovoltaic bridge that once broken, cannot be reversed or even a chemically stable bond when attached, and the AIM changes due to an irreversible chemical reaction when removed from the ART.

FIG. 3C illustrates one example of a diagram key of a TA 116. A TA 116 is an ART that includes a number, i, of AIMs 115. An immutable token ("IT") is a calculated sum of all AIMs 115 of a TA 116 and forms a Roatronic fingerprint of the TA 116. The IT of an TA 116 is calculated and assigned by a manufacturer, assembly, and/or a supplier. The IT value is stored in a database 102 of WAAL and/or in a non-transitory machine readable storage medium of a PPL 110. As will be understood by one of ordinary skill in the art, the IT value may be used to authenticate the ART 114 and to track the movement of the ART through a supply chain.

Figure 4A:
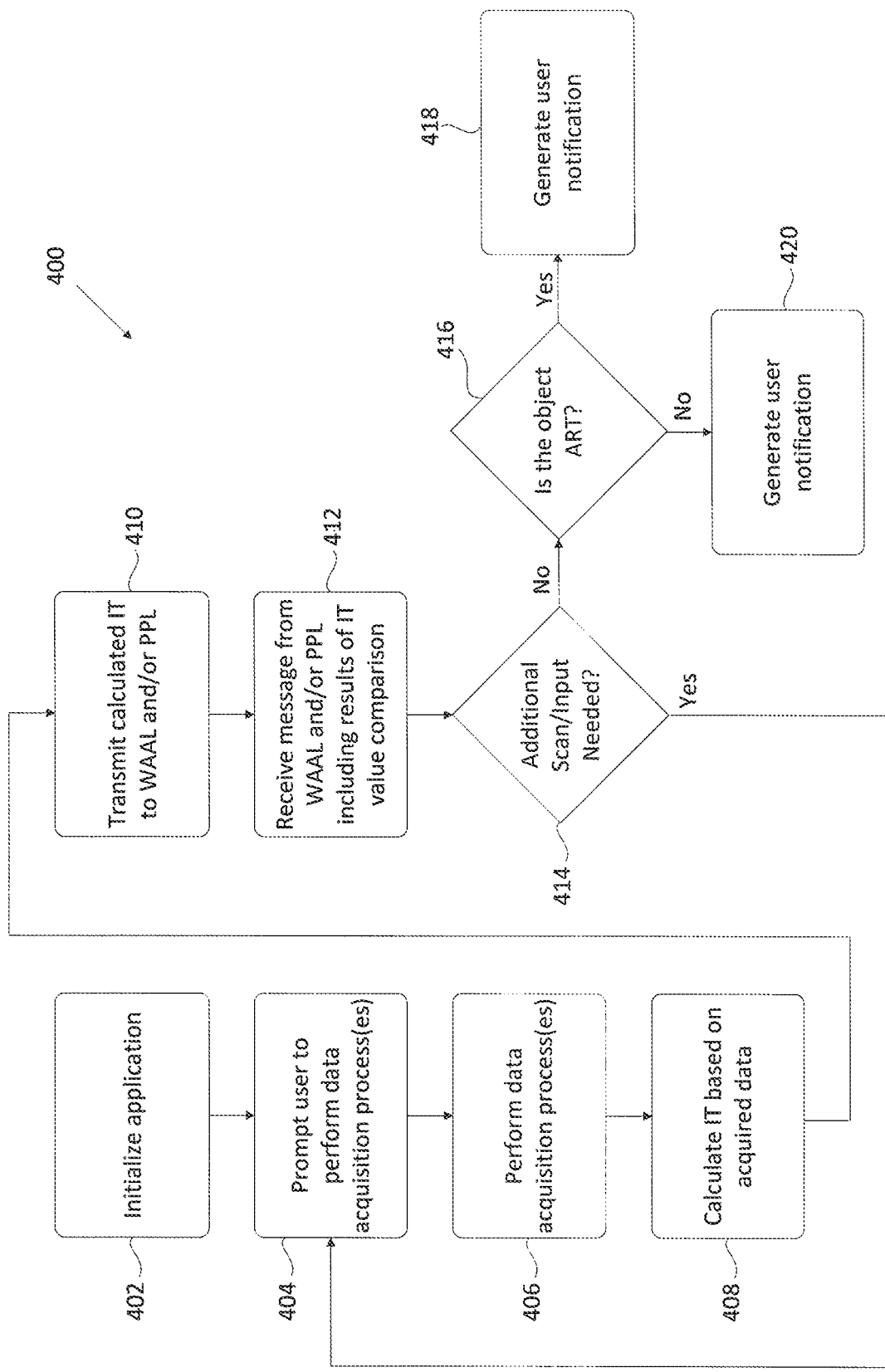
FIGS. 4A-4C are flow diagrams of examples of methods of authenticating an object in accordance with some embodiments.

One example of a method of authenticating an ART 114 using an ITR 108 is described with reference to FIGS. 4A-5F. Referring first to FIG. 4A, method 400 begins at block 402 when the AAVP program is initialized on an ITR 108. FIG. 5A illustrates one example of a home screen of the AAVP displayed to a user of an ITR 108, which takes the form of a tablet or smart phone 140. In some embodiments, the AAVP is executed by a processor of a stationary ITR 108 such as a computer or kiosk. As understood by one of ordinary skill in the art, processor 142 executes the AAVP and causes a home screen graphical user interface ("GUI") to be displayed to a user on display 170. A plurality of virtual icons 180 are presented to a user on display 170. In some embodiments, icons 180 provide a user with various options such as, for example, perform a check ("Check"), access a report ("Report"), win items ("Win"), review authenticated items ("My Stuff"), go to website ("Website"), access social network interface "Social Networks"), help ("Help"), adjust settings ("Settings"), access information or alerts ("Info/ Alerts"), and close the Program ("Close").

If a user selects the Check icon, then the AAVP prompts the user to perform one or more data acquisition processes at block 404. For example and referring to FIG. 5B, a message is displayed to a user on display 170 requesting the user to perform a first data acquisition process, such as scan an RFID tag of a TA 114.

At block 406, the first data acquisition process is performed. In some embodiments, one data acquisition process is performed in response to a user input, such as a user contacting a graphical icon 182 that triggers FUR 108 to perform the first data acquisition process. In embodiments in which the first data acquisition process is an RFID scan, an RFID reader 154, 156 of ITR 108 emits a trigger signal to interrogate an RFID tag affixed to the ART. In some embodiments, the trigger signal is a high frequency signal, e.g., 3-30 MHz, and/or an ultra-high frequency signal, e.g., 300 MHz-3 GHz. In response to the trigger signal, RFID reader(s) 154, 156 receive a signal from an RFID tag, which includes the tag ID ("TID") of the tag. The TID is stored in a memory 144, 146 such that the TID is associated with a data file of the ART being authenticated.

Figure 5B:
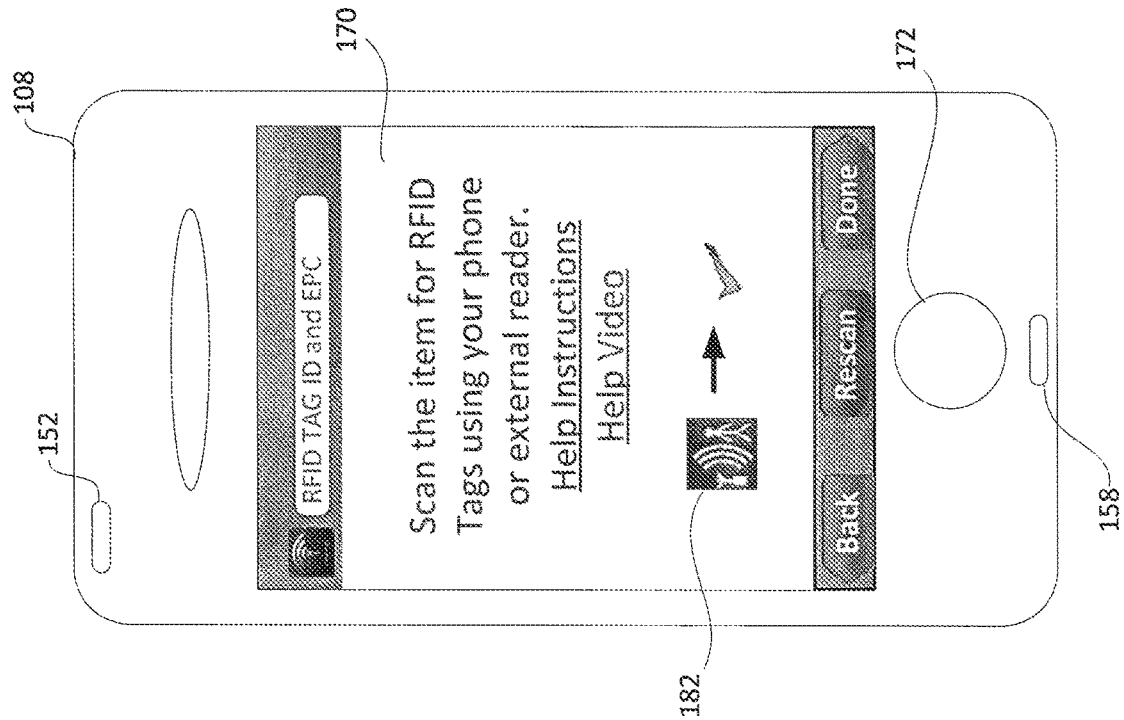
Figure 5A:
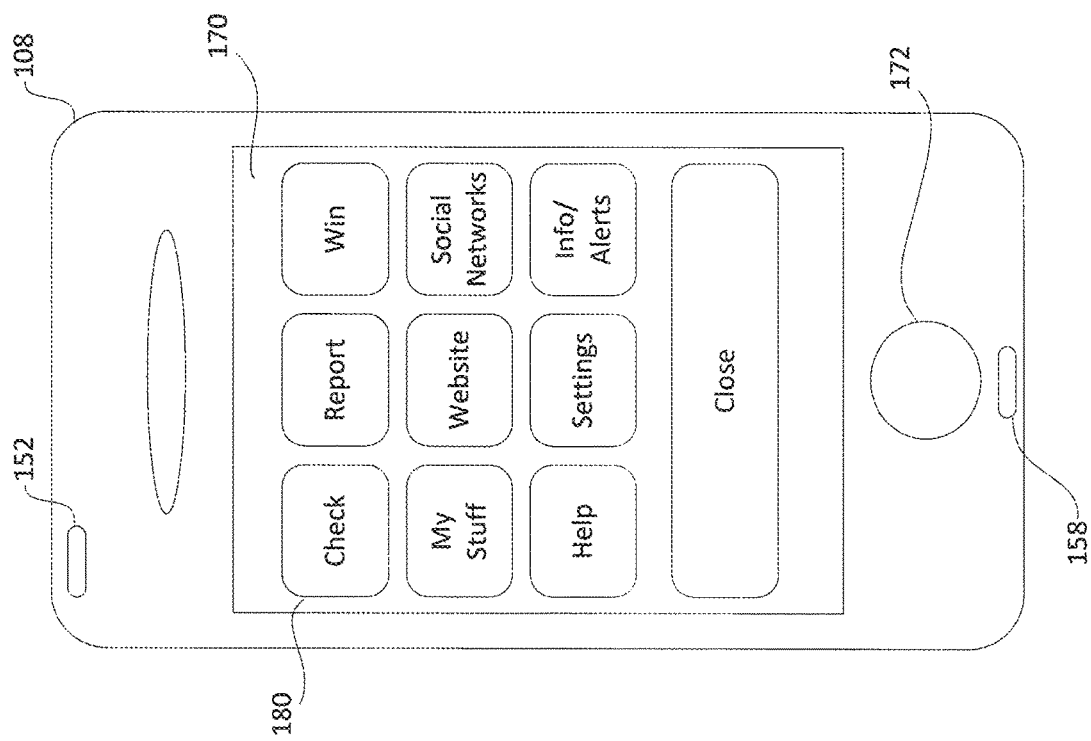
Figure 5C:
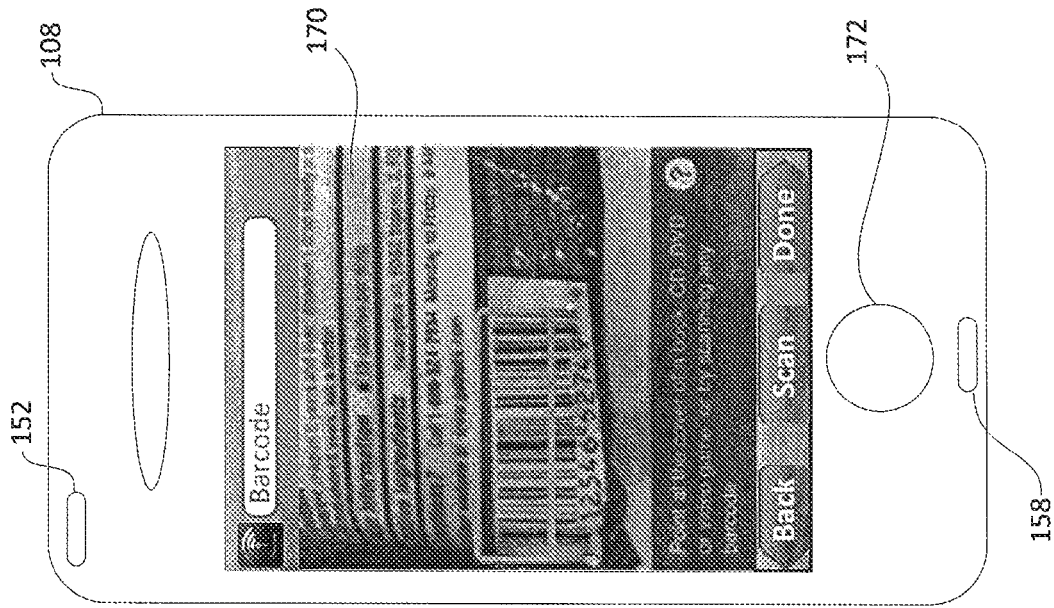
Figure 5D:
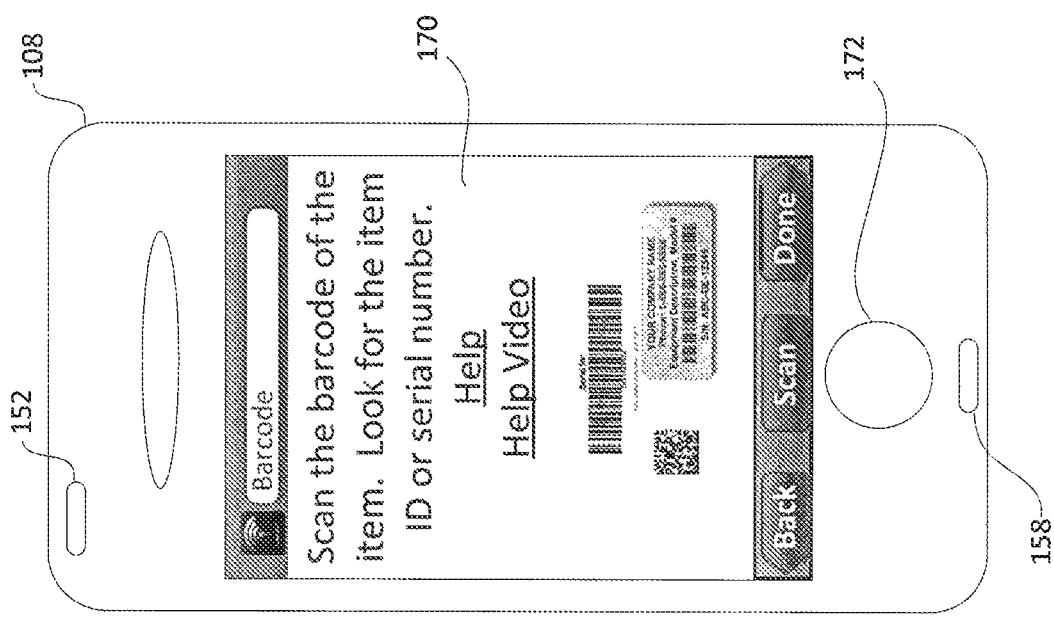

FIGS. 5C and 5D illustrate another example of a data acquisition process that may be performed at blocks 404 and 406. Referring first to FIG. 5C, a GUI is displayed on display 170 prompting a user to scan a barcode. A user tap the "Scan" button, which engages the camera 160. As shown in FIG. 5D, display 170 shows projects the image acquired by the camera 160 such that the user can line up the barcode, which is then scanned by ITR 108.

Each data acquisition process is used to create a profile for the object to confirm that the object is ART. As illustrated in FIG. 5E, display 170 presents a GUI to a user that includes a checklist of possible data acquisition processes that can be formed to collect data for authenticating an object. Examples of such data acquisition processes include, but are not limited to, taking a photograph of the object, taking a photograph of identifying indicia of the object, e.g., a logo or trademark, a barcode scan, and reading an RFID tag, to list but only a few possibilities. FIG. 5F illustrates the checklist having been updated to include a photograph of the object along with the barcode.

In some embodiments, multiple photographs are acquired of various aspects of an object to authenticate an object. For example, if the object being authenticated is apparel, the objects profile stored by WAAL 102 may include numerous parameters that are to be checked for authenticity. Taking a shirt as an example, an authentic version of the shirt may include an RFID tag, a hangtag including a barcode that is looped through a particular buttonhole of the shirt, a company logo or emblem, and a particular type of collar. Consequently, a user of the ITR 108 may be prompted to acquire an image of each of these particular features for comparison by the AAVP and WAAL 102.

In some embodiments, multiple RFID or other scans are used to authenticate an item. For example, a consumer electronics product or OEM assembly for a government entity (e.g., the Department of Defense ("DOD")) typically includes multiple OEM components that can each be interrogated. If the electronic device includes a wireless access chip and a Bluetooth chip, ITR 108 can pair with the electronic device to acquire the Bluetooth ID and a MAC address of the wireless access chip can be acquired by the ITR 108. The Bluetooth ID and MAC address of the wireless access chip are used by the AAVP and WAAL 102 for authentication as described in greater detail below.

In some embodiments, a combination of scans and photographs are used for authenticating an item. For example, a pharmaceutical package may be secured with a tamper-proof (resistant) RFID tag and including a content label comprising a barcode. The content label may include a logo, lot number, expiration date, and/or a manufacturer's list of compounds or ingredients. In some embodiments, the container, which may be a plastic bottle or other suitable pharmaceutical container, is also embossed with a lot number.

ITR 108 interrogates the RFID tag using an RFID reader (e.g., wave reader 122 or RFID readers 154, 156) and acquires one or more images of the label and pharmaceutical package using camera 160. In some embodiments, the AAVP includes an optical character recognition ("OCR") program for extracting data from the one or more images acquired by camera 160. For example, the lot number, expiration date, and/or list of compounds or ingredients can be recognized from the one or more images acquired by camera 160 of ITR 108.

Referring again to FIG. 4A, processor 142 executes AAVP and calculates an IT value for the ART at block 408 based on the AIM values collected during the data acquisition. In some embodiments, the IT calculation includes applying weights to data values. For example, an image may be weighted less than a weight of an RFID tag or barcode value since a counterfeit object may have a similar if not identical appearance to an authentic object. The Raotronic fingerprint, i.e., calculated IT value, is calculated based on several factors including, but not limited to, the number of AIMs 115, types of AIMS 115, accuracy of AIMs, number of records, and number weighting factors. Increasing the number of factors that are taken into consideration increases the strength of the authentication while preventing false negatives as described above.

The following provides one example of an authentication calculation for a shirt, which has a profile identifying a total of 370 possible points, with 200 points provided for a match of a TID of an RFID tag, a barcode match providing 50 points, a color match providing 25 points, a size match providing 20 points, and a lot and cut match providing 75 points. If data acquisition processes are performed on a shirt such that 300 of the possible 370 points are identified (e.g., 200 points for the TID matching, 25 points for the color match, and 75 points for the lot and cut match), then the IT value is 300 or 0.811 percent of a match.

Referring again to the pharmaceutical container example described above, the IT calculation is based on the expiration data, the RFID tag ID, which is weighted five times as much that the expiration data, the lot number bar code, which is weighted twice as much as the expiration data. The visual (e.g., optical) comparison of the company logo may be given a weight of twice that of the expiration data. Out of a possible 100 percent match, the data acquisition processes may identify a 90 percent of the possible values based on a horizontal confidence. Based on a population of several thousands of bottles in the lot, the value is strengthened by five percent to 95 percent. If a manufacturer had been alerted that the lot number had been compromised, then the value may be lowered to 85 percent.

At block 410, the IT value calculated by ITR 108 (and other data in some embodiments) is transmitted to a WAAL 102 and/or to a PPL 110. The calculated IT value can be transmitted to WAAL, 102 and/or to one or more PPLs 110 via network 112. In some embodiments, the message transmitting the calculated IT value is encrypted prior to transmission.

The process performed by WAAL 102 in response to receiving the message and the calculated IT value from ITR 108 is described with reference to FIG. 4B, which is a flow diagram of one example of an authentication method 430 performed by WAAL 102. At block 432, WAAL 102 receives the message including the calculated IT value. In some embodiments, the message including the calculated IT value is received directly from ITR 108 via network 114, and, in some embodiments, WAAL 102 receives the calculated IT value from a PPL 110, which forwards the calculated IT value in the event PPL 110 was not able to confirm the authenticity of the object based on the calculated IT value as described in greater detail below with respect to FIG. 4C.

At block 434, the calculated ITR value (and other data, if applicable) is extracted from the message and compared to IT values stored in database 104. In some embodiments, WAAL 102 hashes the ITR value and compares the hash key to a hashing table to determine if the calculated IT value resides in memory. In some embodiments, WAAL 102 performs a straight comparison of the calculated value to the stored IT values.

At block 436, WAAL 102 transmits a message to FIR 108 that confirms the authentication of the object as being an ART 114, identifies the object as not being ART 114, requests additional information, and/or identifies a probability that the item is authentic or counterfeit. In some embodiments, the message transmitted directly from WAAL 102 to ITR 108 via network 114. In some embodiments, such as embodiments in which WAAL 102 receives the message from ITR 108 via a PPL 110, WAAL 102 transmits a message destined for ITR 108 to PPL 110 with instructions to forward the message to ITR 108.

If the calculated IT value received from ITR 108 matches a value stored in database 104 or varies from a value stored within database 104 within a first predetermined error range, then WAAL 102 transmits a message identifying that the object interrogated by ITR 108 is ART 114. If the IT value does not match an IT value in database 104 and is outside the first predetermined range, but within a second predetermined range, then the message transmitted from WAAL 102 requests ITR 108 provide additional data and/or recalculate the IT value before WAAL 102 will authenticate the object as ART 114. If the calculated IT value received from ITR 108 does not match an IT value in database 104 and is outside of the second predetermined range, then the message transmitted from WAAL 102 to ITR 108 identifies the object as not being ART 114. As will be understood by one of ordinary skill in the art, the greater the number and strength of AIMS 115, and depending on the closeness of the match to the WAAL database 104, the higher the probability is that the object is ART 114.

Figures 4B, 4C:
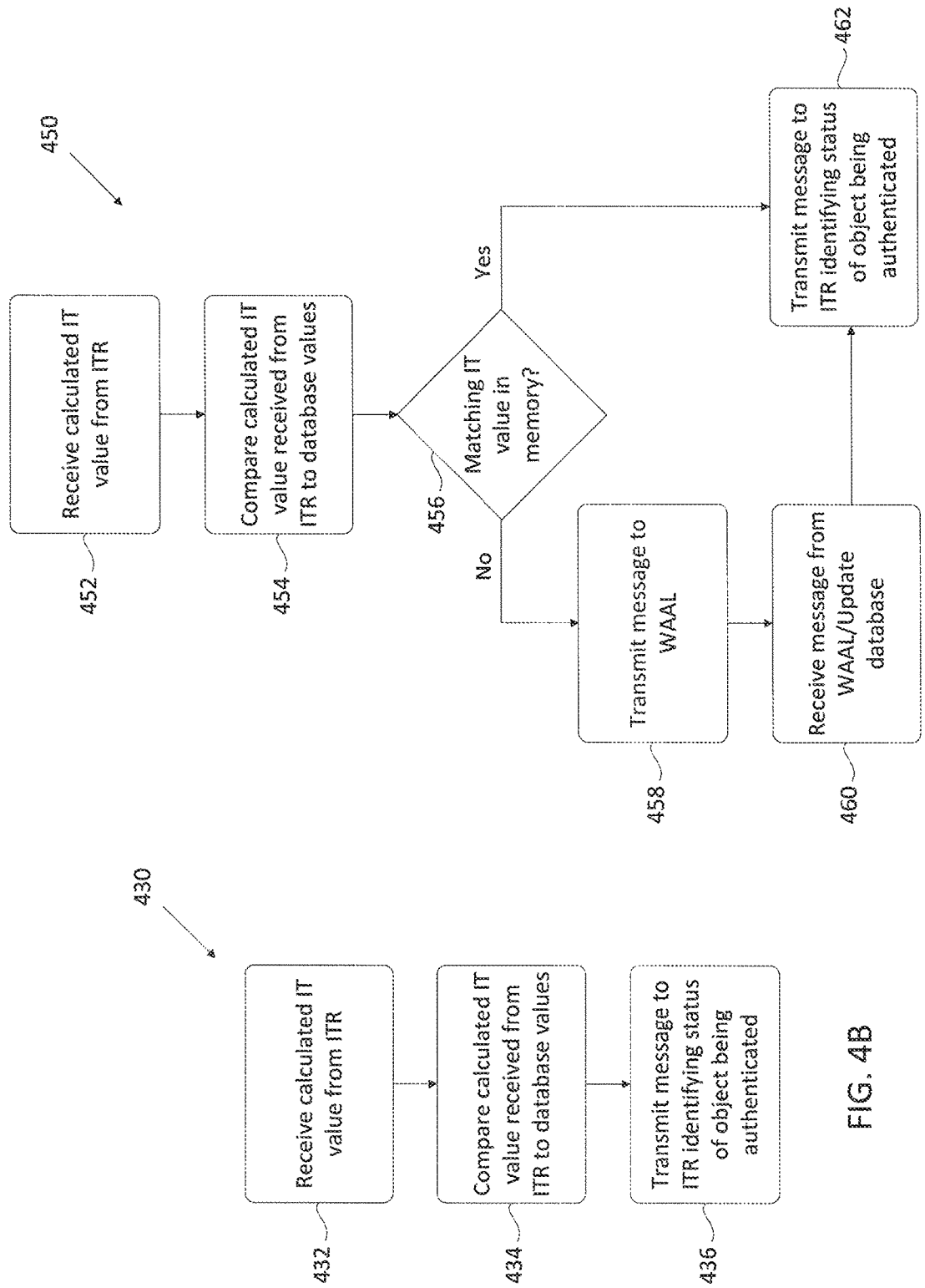

Turning now to FIG. 4C, which is a flow diagram of an authentication method 450 performed by a PPL 110, PPL 110 receives a message including the calculated IT value from ITR 108 via network 114 at block 452.

At block 454, PPL 110 extracts the calculated IT value from the message and compares the extracted IT value to values stored in a database controlled by and local to PPL 110. In some embodiments, PPL 110 hashes the ITR value received from ITR 108 and compares the hash key to a hashing table to determine if the calculated IT value resides in memory. In some embodiments, PPL 110 performs a straight comparison of the calculated IT value received from ITR 108 to stored IT values.

At decision block 456, PPL 110 determines if the calculated IT value received from ITR 108 matches an IT value within the local database or is within a first or second predetermined range of one of the stored IT values.

If the calculated IT value received from ITR 108 does not match and is not within one of the predetermined error ranges, then method 450 proceeds to block 458. At block 458, PPL 110 transmits a message including the calculated IT value received from ITR 108 to WAAL 102, which performs the authentication check method 430 described above with respect to FIG. 4B. PPL transmits the message to WAAL 102 such that WAAL 102 can perform a secondary check of the calculated IT value using WAAL's database 104, which is larger than a database retained by PPL 110.

At block 460, PPL 110 receives message from WAAL 102. In some embodiments, the message received from WAAL 102 includes a copy of an IT value and the associated data of ART 114 if WAAL 102 was able to identify a match (or a suitable match within a predetermined error range) to the calculated IT value received from ITR 108. PPL 110 extracts the data included in the message from WAAL 102 and updates its associated database. In some embodiments, the message received from WAAL 102 identifies that WAAL 102 was not able to identify an identical or suitable match (i.e., a match within a predetermined range).

At block 462, PPL 110 transmits a message to ITR 108 via network 114. If the calculated IT value received from ITR 108 matched or was a suitable match (i.e., is within a first predetermined range of an IT value) as determined by PPL 110 or by WAAL 102, then PPL 110 transmits a message to ITR 108 identifying that the interrogated object is an ART 114. If the calculated value received from ITR 108 does not match an IT value and is not within the first predetermined range, but is within a second predetermined range as determined by PPL 110 or WAAL 102, then PPL 110 transmits a message to ITR 108 requesting additional data and/or requesting ITR 108 to recalculate the IT value. If the calculated IT value received from ITR 108 does not match an IT value and is outside of the second predetermined range as determined by PPL 110 or WAAL 102, then the message transmitted from PPL 110 to ITR 108 identifies the object as not being ART 114.

Referring again to FIG. 4A, ITR 108 receives a message from WAAL 102 or PPL 110 and determines if additional data acquisition is needed at decision block 414. ITR 108 determines if additional data acquisitions processes should be performed based on the message received from WAAL 102 or PPL 110. If additional data acquisition is needed, then ITR 108 proceeds to block 404 where a user is prompted to performed one or more data acquisition processes. As described above; additional data acquisition may be needed if WAAL 102 and/or PPL 110 cannot definitively determine if the calculated IT value corresponds to a stored IT value. For example, if the calculated value does not exactly or suitably match a stored IT value, but is with the second predetermined range of values, then additional data acquisition processes should be performed.

A notification that additional data acquisition is required to authenticate the object can be provided to the user. For example, display 170 can generate a message requesting additional data acquisition. In some embodiments, LEDs 152 can generate a predetermined color, e.g., a yellow light, which indicates that additional data acquisition is needed before the object can be authenticated. Speaker 174 and/or oscillator 176 can also generate notifications to a user. For example, speaker 174 may emit multiple beeps or tones or play a message requesting additional data acquisition steps be performed. Oscillator 176 may provide a series of short or long pulses, which indicates that additional data steps are needed before the object can be authenticated as ART/TA. One of ordinary skill in the art will understand that the notifications are not exclusive of one another and each can be simultaneously generated. In some embodiments, the AAVP enables a user to customize the types of notifications he/her would like to receive, e.g., audible, tactile, and/or visual.

If additional data acquisition is not needed, then ITR 108 moves to decision block 416 to determine if the interrogated object is ART 114. In some embodiments, the decision at block 416 is based on the message received from WAAL 102 or PPL 110. If the object is determined to be ART 114, then ITR 108 moves to block 418 and generates one or more notifications to a user on display 170 identifying that the object is ART. For example, display 170 can generate a message identifying the object as ART/TA. In some embodiments, LED(s) 152 emit a light, such as a green light, signifying that the object is ART/TA. Speaker 174 can emit a sound indicating the object is ART/TA and/or oscillator 176 can generate a series of pulses signifying that the object is authentic.

If the object is determined to not be ART 114, then ITR 108 moves to block 420 and generates one or more notifications to a user on display 170 identifying that the object is not ART. Visual, audible, and/or tactile notifications can be generated by one or more of LED(s) 152, display 170, speaker 174, and/or oscillator 176. For example, LED(s) 152 can be configured to generate a red light and display can be configured to generate a message conveying that the object is not authentic. Speaker 174 can be configured to emit a noise or message, and oscillator 176 can be configured to provide one or more pulses that identify the object as not being authentic.

Figure 6A:
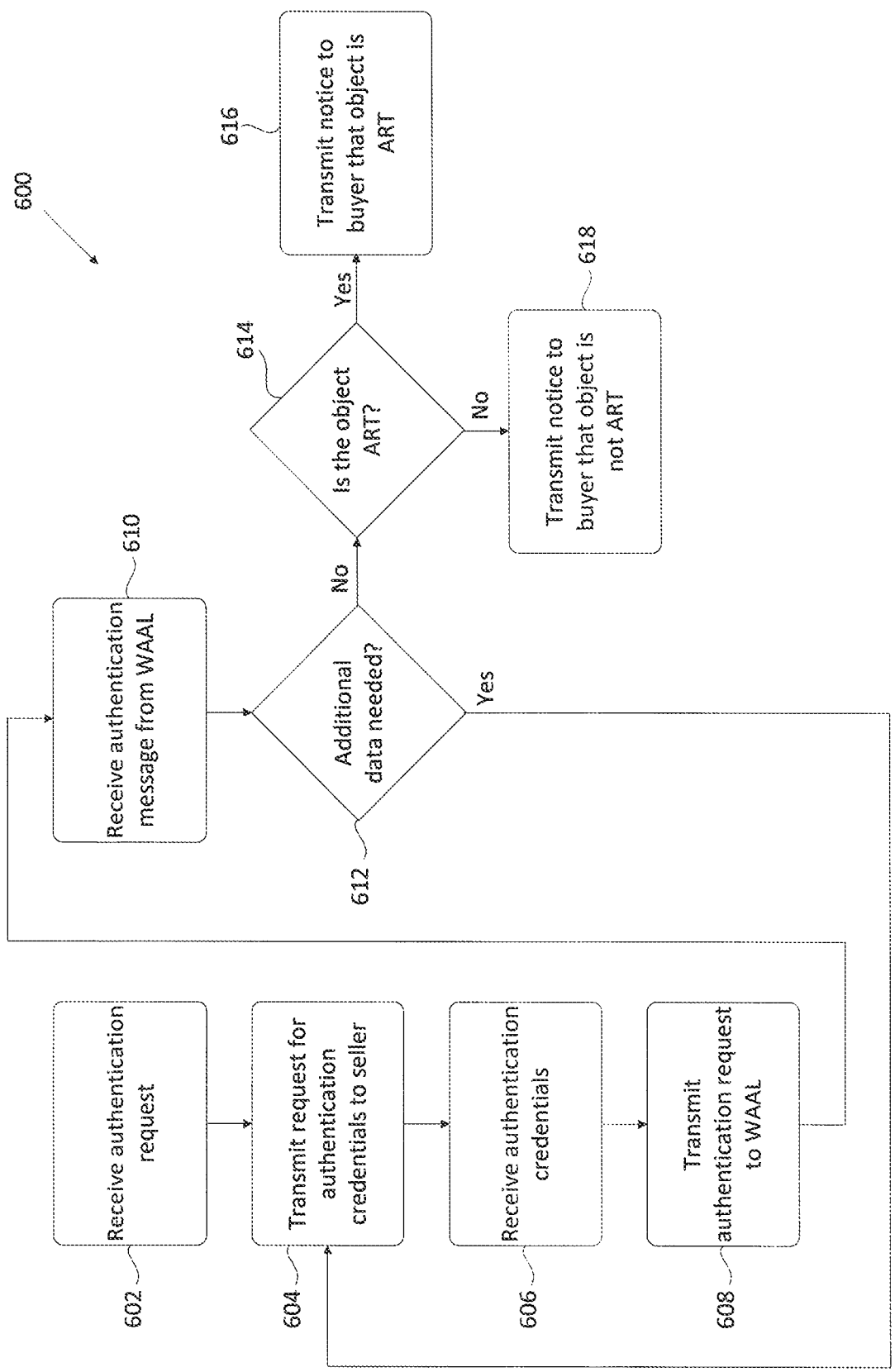
FIGS. 6A-6B are flow diagrams of examples of methods of authenticating an object in accordance with some embodiments.

WAAL 102 can also be used to authenticate goods purchased via an online retailer or reseller. One example of such an authentication method is described with reference to FIGS. 6A-6B, which are flow diagrams of one example of such a method. Referring first to FIG. 6A, an online marketer 119, such as a distributer or auction house, receives a request from a purchaser for the marketed object to be authenticated at block 602.

At block 604, online marketer 119 transmits a message to the seller requesting the AIM values or other authentication credentials. The message transmitted to seller can request various AIMs including, but not limited, the serial number and product number, which may be obtained from one or more barcodes, the location from which the object was procured, where the object currently resides, the NFC data if the object includes an NFC tag, and one or more multi dimension photos or videos of the object, to provide only a few non-limiting examples.

At block 606, online marketer 119 receives one or more AIMS from the seller in response to the transmitted request. In some embodiments, online marketer 119 calculates an IT value for the object based on the AIMS received from seller. In some embodiments, online marketer 119 stores the AIM values received from seller without calculating an IT value.

At block 608, online marketer 119 transmits an authentication request to WAAL 102 or to PPL 110. In some embodiments, the authentication request message transmitted to WAAL 102 includes an IT value calculated by online retailer 119, and in some embodiments, the authentication request message transmitted to WAAL 102 includes the AIM values received from the seller.

Figure 6B:
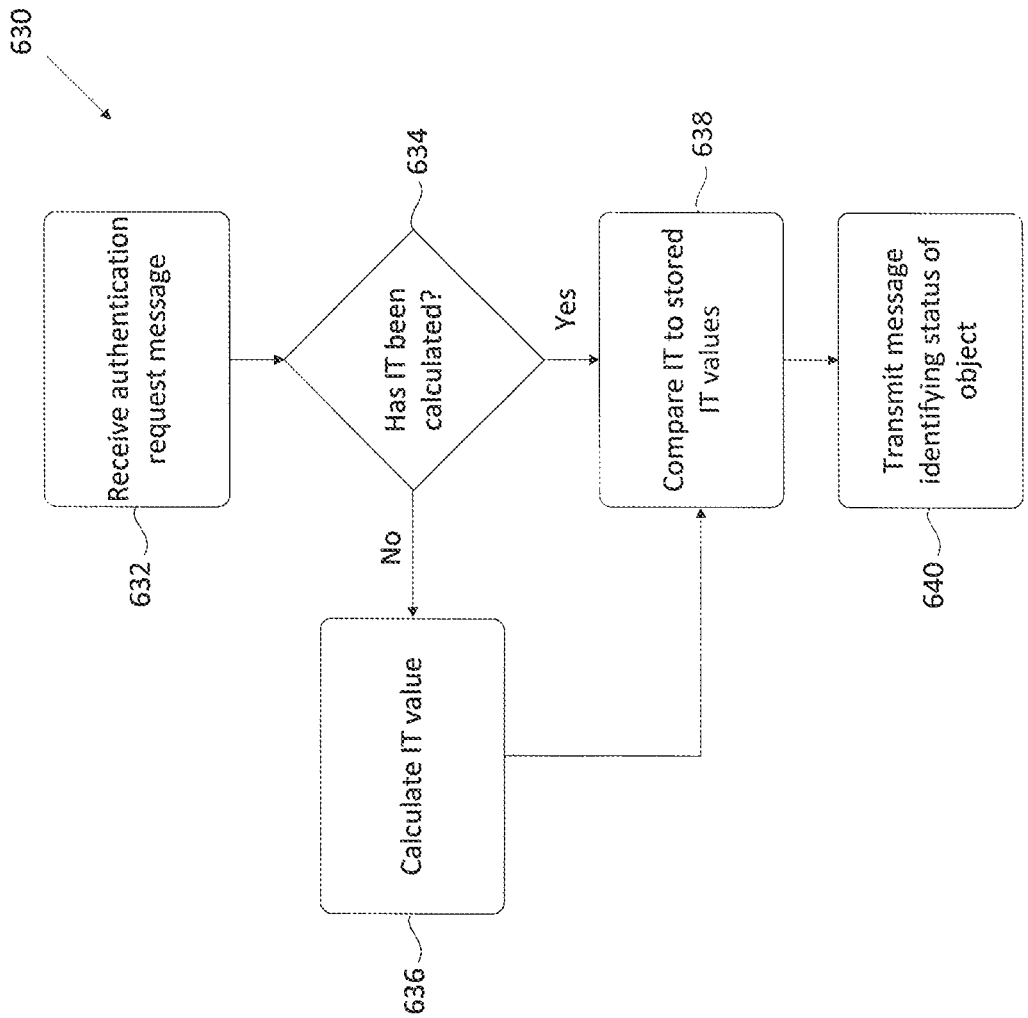

Referring now to FIG. 6B, which is a flow diagram of one example of an authentication method performed by WAAL 102, WAAL 102 receives the authentication request message at block 632. In some embodiments, the authentication request message received from online marketer 119 is received via network 114 in accordance with the API of WAAL 102.

At decision block 634, WAAL 102 parses the received message and determines if the message includes a calculated IT value. If the message does not include an IT value, then method 630 moves to block 636 where WAAL 102 calculates an IT value from the AIM values provided in the message received from online retailer 119.

At block 638, with an IT value having been calculated either by online retailer 119 or by WAAL 102, WAAL 102 compares the calculated IT value to IT values stored in database 104. In some embodiments, the comparison at block 638 includes hashing the calculated IT value and comparing the hash key to a hash table stored in database 104. In some embodiments, WAAL 102 performs a straight comparison of the calculated IT value to the stored IT values.

At block 640, WAAL 102 transmits a message to online retailer 119 that confirms the authentication of the object as an ART 114, identifies the object as not being ART 114, or requests additional information. For example, if the calculated IT value matches a value stored in database 104 or is within a suitable range of values stored as an authenticity defining criterion (i.e., is within a first predetermined range), then WAAL 102 transmits a message identifying that the object is ART 114. If the calculated IT value does not match an value in database 104 and is outside the first predetermined range, but within a second predetermined range, then the message transmitted from WAAL 102 to online retailer 119 requests additional data. If the calculated IT value does not match an IT value in database 104 and is outside of the second predetermined range, then the message transmitted from WAAL 102 to online retailer identifies the object as not being ART 114.

Turning back to FIG. 6A, online retailer 119 receives the authentication message from WAAL 102 at block 610. As described above, the authentication message received from WAAL 102 includes a determination of whether the object is ART 114, the object is not ART 114, or additional information is needed by WAAL 102 before WAAL 102 can authenticate the object.

At decision block 612, online retailer 119 determines whether additional information is needed before the object can be authenticated. If the message received from WAAL 102 identifies that additional information is needed (i.e., the calculated IT value was outside of the first predetermined range, but within the second predetermined range), then method 600 moves to block 604 and requests the seller to provide additional information about the object.

If the message received from WAAL 102 identifies that additional information is not needed (i.e., the calculated IT value was within the first predetermined range or outside the second predetermined range), then method 600 moves to decision block 614 to determine if the object has been authenticated, i.e., if the object is ART 114.

If the message received from WAAL 102 identifies the object as being ART 114, then online retailer 119 transmits a message to the prospective buyer at block 616 that notifies the buyer that the object cannot be authenticated and is ART. In some embodiments, the message transmitted to the prospective buyer at block 616 includes a certificate of authentication that includes embedded links to a website or portal maintained by WAAL 102 that enables the prospective buyer to access the profile of the object that has been identified as ART 114. The ART profile can include AIM data including, but not limited to, the name of the vendor, date of certification, certification product details and a description of the product.

If the message received from WAAL 102 identifies the object as not being ART 114, then online retailer 119 transmits a message to the prospective buyer at block 618 that notifies the buyer that the object can be authenticated, but that it is not ART.

The systems and methods described above can also be used to assess risk for large assemblies in which authentication is critical such as assemblies for national defense (e.g., ears, trucks, drones, fighter planes, self-guided munitions, etc.). For example and referring to FIG. 7, the AAVP can be configured to present graphics to a user on a display 124, 170 that identifies the likelihood of authentication and the associated risk. The amount of risk associated with a certain authenticity percentage may be configured by a particular entity, e.g., government, defense contractor, etc.

Figure 7:
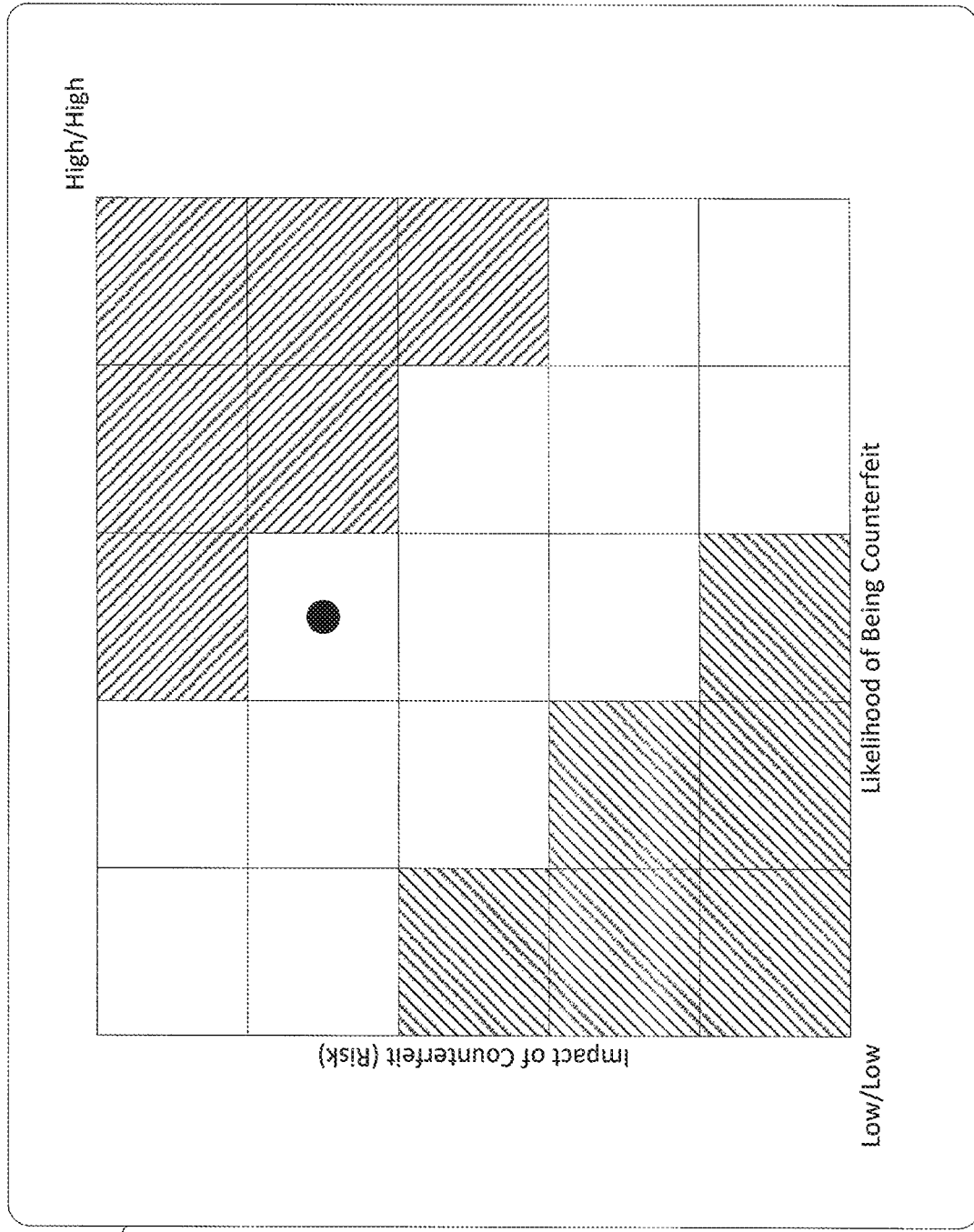
FIG. 7 illustrates one example of a graphic displayed to a user identifying risk associated with a large assembly.

The AAVP generates the graphics illustrated in FIG. 7 after performing numerous data acquisition processes on one or more components of the assembly. Interrogating the components in a supply chain or a finished assembly provides an increased assurance that the goods are authentic and have not been tampered.

The systems and methods described above advantageously enable objects to be identified using various data. The WAAL, a central repository of authentication information, is able to be accessed via networks such that individual users and organizations can access the database. By providing data that can be used for authentication, brand name owners and manufacturers can track goods through supply chains as well as ensure that the ultimate purchasers are receiving authentic goods.

The present invention can be embodied in the form of methods and apparatus for practicing those methods. The present invention can also be embodied in the form of program code embodied in tangible media, such as secure digital ("SD") cards, USB flash drives, diskettes, CD-ROMs, DVD-ROMs, Blu-ray disks, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system for validating the authenticity of a physical, non-human object, the system comprising:
a first computing device, communicatively coupled to a network, the first computing device configured to:
receive a first message over the network from a second computing device, the first message containing first data based on at least two sensed non-biometric characteristics of the object;
match the first data against a database communicatively coupled to the first computing device to retrieve authentication information from the database by calculating an authentication value, based at least in part on the first data, and by matching the authentication value against the database, wherein calculating the authentication value is based, at least in part, on applying at least one of a score or a weight to the at least two sensed non-biometric characteristics of the object;
determine a likelihood of authenticity of the object, based, at least in part, on the authentication information;
update the database based on information in the first data and on the likelihood of authenticity; and
send a second message over the network to the second computing device, the second message including second data indicative of the likelihood of authenticity of the object.

2. The system of claim 1, wherein the database stores a history of the object, and wherein the first computing device is configured to update at least one of the score or the weight, based, at least in part, on the history of the object.

3. The system of claim 1, wherein the database stores a history of the object, and wherein the first computing device is configured to calculate the authentication value based, at least in part, on the history of the object.

4. The system of claim 1, wherein the database stores a history of the object.

5. The system of claim 4, wherein the first computing device is configured to update the database by adding information on the first data and on the likelihood of authenticity to the history of the object.

6. The system of claim 4, wherein the first message further includes location data on a location of the object, and wherein the first computing device is configured to update the database by adding the location data to the history of the object.

7. The system of claim 4, wherein the first message further includes supply chain data on a stage in a supply chain for the object, and wherein the first computing device is configured to update the database by adding the supply chain data to the history of the object.

8. The system of claim 4, wherein the first computing device is configured to match the first data against the database based, at least in part, on the history of the object.

9. The system of claim 4, wherein the first computing device is configured to send at least a portion of the history of the object to at least one of the second computing device or a third computing device configured to validate the authenticity of the object.

10. The system of claim 1 wherein the first computing device is configured to match the first data against the database using at least one of information quantification, pattern matching, artificial intelligence, optical recognition, key marking, fuzzy logic, quantum computing, chaos theory, or entropic intelligence networks.

11. The system of claim 1, wherein the first computing device is controlled by a manufacturer of the object, and wherein the first computing device is further configured to send a third message over the network to a public validation library, the third message including data based on information from the first message, and on the likelihood of authenticity.

12. The system of claim 1, wherein the first computing device is controlled by a first entity in a supply chain of the object, and wherein the first computing device is further configured to send a third message over the network to a second entity in the supply chain of the object, the third message including data based on information from the first message, and on the likelihood of authenticity.

13. A method for validating the authenticity of a physical, non-human object, the method comprising:
- receiving at a first computing device a first message over a network from a second computing device, the first message containing first data based on at least two sensed non-biometric characteristics of the object;
- matching the first data against a database communicatively coupled to the first computing device to retrieve authentication information from the database;
- determining a likelihood of authenticity of the object, based, at least in part, on the authentication information;
- updating the database based on information in the first data and on the likelihood of authenticity; and
- sending a second message over the network to the second computing device, the second message including second data indicative of the likelihood of authenticity;
- wherein matching the first data against the database comprises calculating an authentication value, based at least in part on the first data, and matching the authentication value against the database; and
- wherein calculating the authentication value comprises applying at least one of a score or a weight to the at least two sensed non-biometric characteristics of the object.

14. The method of claim 13, wherein updating the database comprises adding location data on a location of the object to a history of the object stored in the database.

15. The method of claim 13, wherein updating the database comprises adding supply chain data on a stage in a supply chain for the object to a history of the object stored in the database.

16. The method of claim 13, further comprising sending at least a portion of a history of the object stored in the database to at least one of the second computing device or a third computing device configured to validate the authenticity of the object.

* * * * *